June 5, 1956  C. L. DAY ET AL  2,748,885
LIQUID DEAERATOR
Filed Sept. 17, 1953  4 Sheets-Sheet 1

INVENTORS:
Carl L. Day,
Ransom C. Albrecht,
BY Cushman, Darby & Cushman
ATTORNEYS.

INVENTORS:
Carl L. Day, &
Ransom C. Albrecht,
BY Cushman, Darby & Cushman
ATTORNEYS June 5, 1956  C. L. DAY ET AL  2,748,885
LIQUID DEAERATOR
Filed Sept. 17, 1953  4 Sheets-Sheet 4
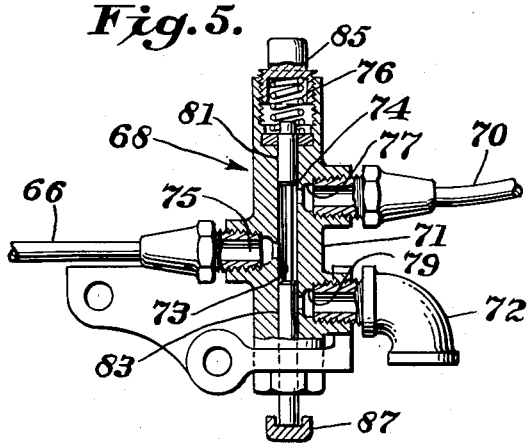
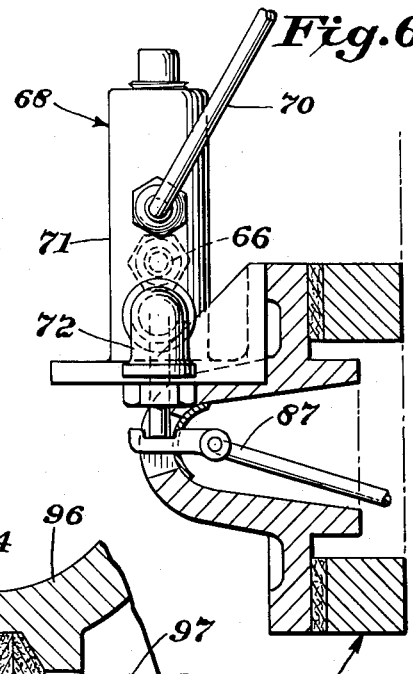
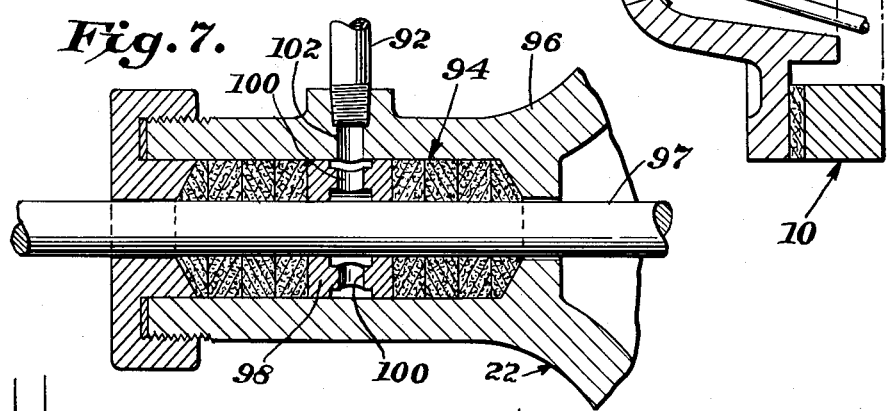
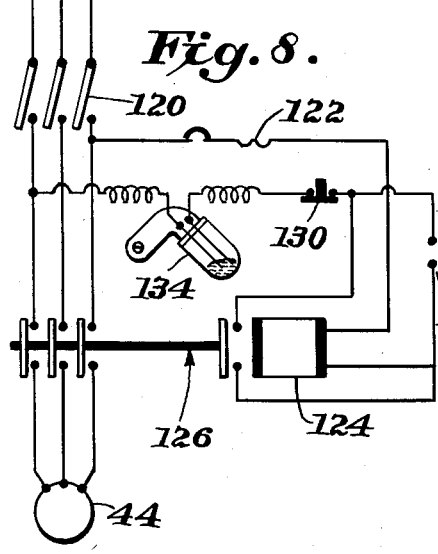
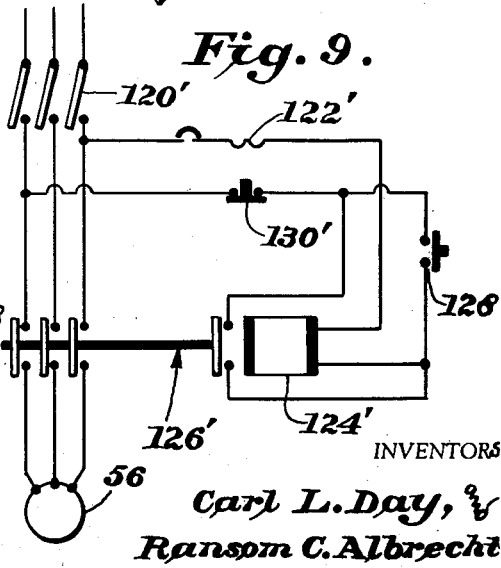
INVENTORS
Carl L. Day,
Ransom C. Albrecht
BY Cushman, Darby & Cushman
ATTORNEYS United States Patent Office 2,748,885
Patented June 5, 1956

2,748,885
LIQUID DEAERATOR

Carl L. Day and Ransom C. Albrecht, Baltimore, Md., assignors to Crown Cork & Seal Company, Inc., Baltimore, Md., a corporation of New York Application September 17, 1953, Serial No. 380,794

14 Claims. (Cl. 183—2.5)

The present invention relates to an apparatus for deaerating a raw liquid, and more particularly, an apparatus for deaerating water which is to be carbonated and used in the processing of a carbonated beverage.

In the processing of a carbonated beverage, it is very undesirable and often detrimental to have air dissolved in the liquid being carbonated. This is also true if there is air in the liquid of a bottled carbonated beverage. The oxygen component of air will oftentimes cause loss of flavor and aroma in many beverages while in other beverages it will oxidize the natural oils therein and, thus, promote bitterness and rancidity. Although the foregoing oxidative effects will not be apparent in beverages having a short shelf life, they will be apparent and are undesirable where the beverage has a long shelf life. Further, the oxygen and nitrogen components of air oftentimes manifest themselves immediately in the filling by a "stripping action." The "stripping action" of oxygen and nitrogen components of air dissolved in a liquid constitute the greatest form of annoyance to bottlers and, therefore, an object of the present invention is the provision of an apparatus which will produce a deaerated liquid that has a minimum amount of residual air and is stable so that there will be no "stripping action" in the filling or the opening of a bottle.

A further object of the present invention is the provision of an apparatus wherein a uniform amount of air is removed from the liquid being deaerated throughout the entire operation of the apparatus. By controlling the infeed of raw liquid to the apparatus and by making this control dependent upon the level of liquid in the apparatus and operative upon the amount of vacuum established in the apparatus, a uniformly deaerated liquid can be produced which has a minimum amount of residual air per liter of liquid treated.

Another object of the present invention is to provide a sanitary, efficient and practical apparatus for deaerating water intended for human consumption. The present invention contemplates the use of a minimum of parts having surfaces which are easily drained and cleaned.

A still further object of the present invention is the provision of means for removing the deaerated liquid from the apparatus against the high vacuum therein. In the prior art, liquids were deaerated by utilizing coke packing, Raschig rings, but in baffles or the like to provide wetting surfaces for deaerating of the liquid. A further attempt to secure low residual air content in the liquid was also performed by a method known as the "flash" or "stripping" method wherein the incoming liquid was heated so that it would actually boil when subjected to a slight vacuum and would release the entrapped gases. The above-mentioned types of apparatus required rather elaborate control equipment and imposed high operating expense on the bottler. By provision of means for removing the liquid when it is subjected to a high vacuum, the equipment involved and the operating expense are materially reduced.

A still further object of the present invention is the provision of an apparatus which may be started or stopped any number of times during the course of an operating day, or may be shut down overnight and, yet, will deliver a deaerated liquid having a uniform amount of residual air on starting and at all times. By having controls on the apparatus whereby a uniformly deaerated liquid is always delivered, the disadvantage in carbonating or filling, known as "wild condition" is eliminated. A "wild condition" is caused by an attempt to carbonate or fill with an unstable liquid. In other words, air or gases which are loosely held in the liquid will adversely affect the equilibrium state of the liquid when carbonated because the air or gases will start to leave the solution and form a nucleus for gathering carbon dioxide bubbles. This condition will cause foaming in the filling or in the bottled product when the bottled product is first opened.

These and other objects of the invention will appear more clearly in the following specification, claims and drawings in which:

Figure 5 is an enlarged detailed sectional view of the pilot control valve;

Figure 6 is an enlarged side elevational view of the pilot control valve of Figure 5 and showing it connected to the deaerating tank;

Figure 7 is an enlarged detailed view of the pump stuffing box and lantern ring assembly;

Figure 8 is a wiring diagram for the operating circuit of the vacuum pump motor, and Figure 9 is a wiring diagram for the operating circuit of the liquid discharge pump motor.

Figure 1:
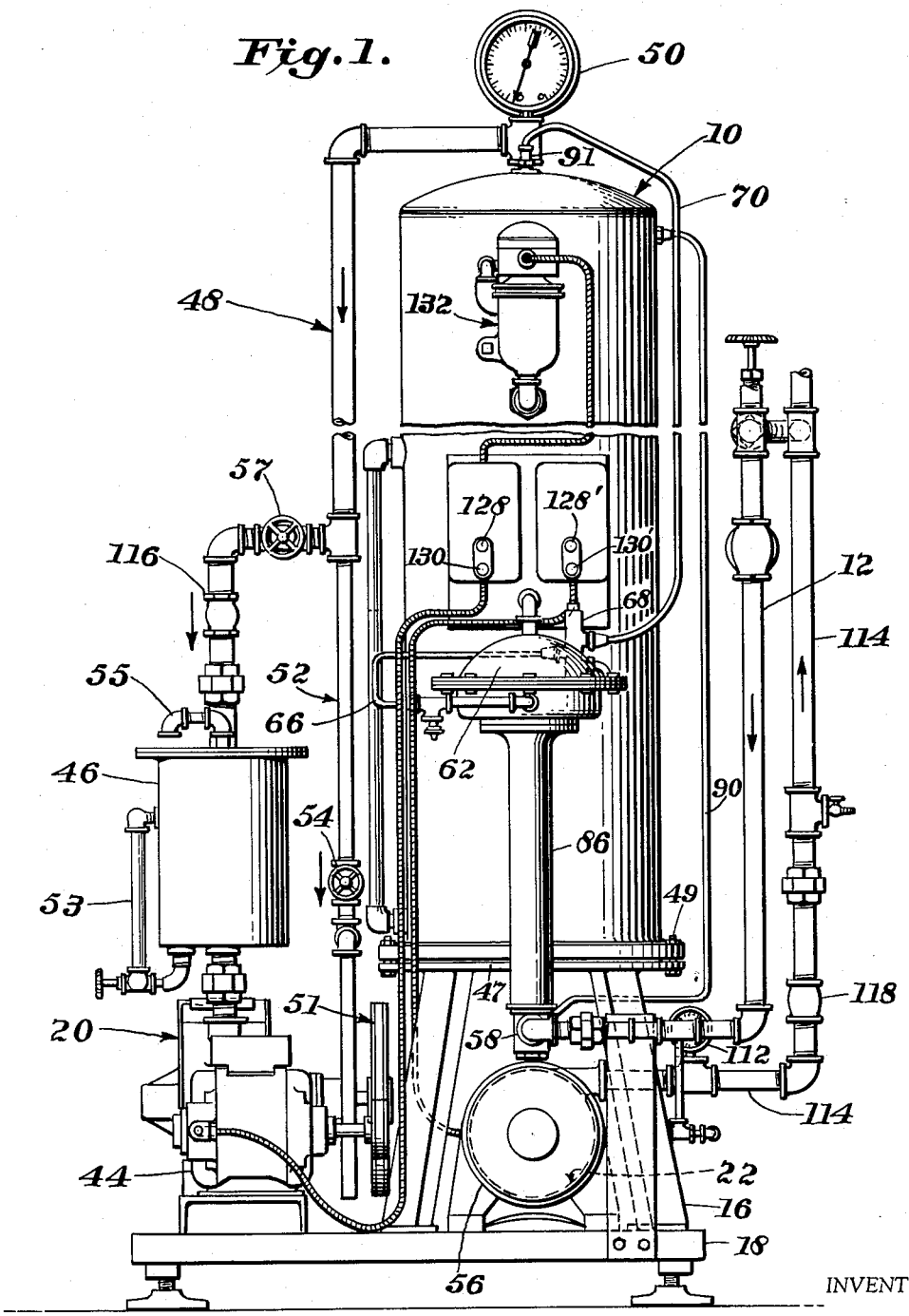
Figure 1 is a front elevational view of the apparatus.

Referring specifically to the drawings wherein like character or reference numerals represent like or similar parts, the deaerating apparatus of the present invention consists generally of an elongated cylindrical upright enclosed tank 10 having an inlet pipe or conduit 12 for supplying a raw liquid thereto and an outlet pipe or conduit 14 for discharging deaerated liquid therefrom to the inlet side of a liquid discharge pump 22. Tank 10, which has removable bottom 47 held in place by a series of bolts 49, is supported on the standards 16 mounted on a stand or platform 18. Also mounted on platform 18 is a vacuum pump 20 and the deaerated liquid discharge pump 22. The raw liquid to be deaerated is fed into the tank 10 through the inlet pipe 12 and the vacuum established in the tank will cause the air entrained in the liquid to be released therefrom. Pump 22 will discharge the liquid from tank 10 when it is desired to pump the deaerated liquid to a carbonator or the like.

Throughout the specification and claims the terms "raw liquid" or "raw water" will be used. These terms refer to liquid and water which contain a normal amount of dissolved air or gas prior to the deaeration process. Further, although the apparatus is specifically designed for use in deaerating raw water which is used in the preparation of carbonated beverages it is, of course, within the scope of the invention that the apparatus may be used to deaerate liquids other than water. Consequently, the terms "raw liquid" and "deaerated liquids" are used throughout the specification and are meant to include water or other liquids.

As previously indicated, the specific apparatus disclosed herein is for use in connection with the manufacture of a beverage. In other words, in manufacturing a carbonated beverage, the water used for carbonation must first be deaerated to remove air entrained therein and then the water is transferred to a carbonator where complete carbonation can be obtained. Bottlers desire stable deaerated water for carbonation as this type of water eliminates problems such as foaming at filling, improper carbonation and the like. Although the present invention is disclosed and used in connection with preparation of a carbonated beverage, it is well within the scope of the invention that it may be used in connection with other equipment where it is desired to deaerate a liquid.

Figure 2:
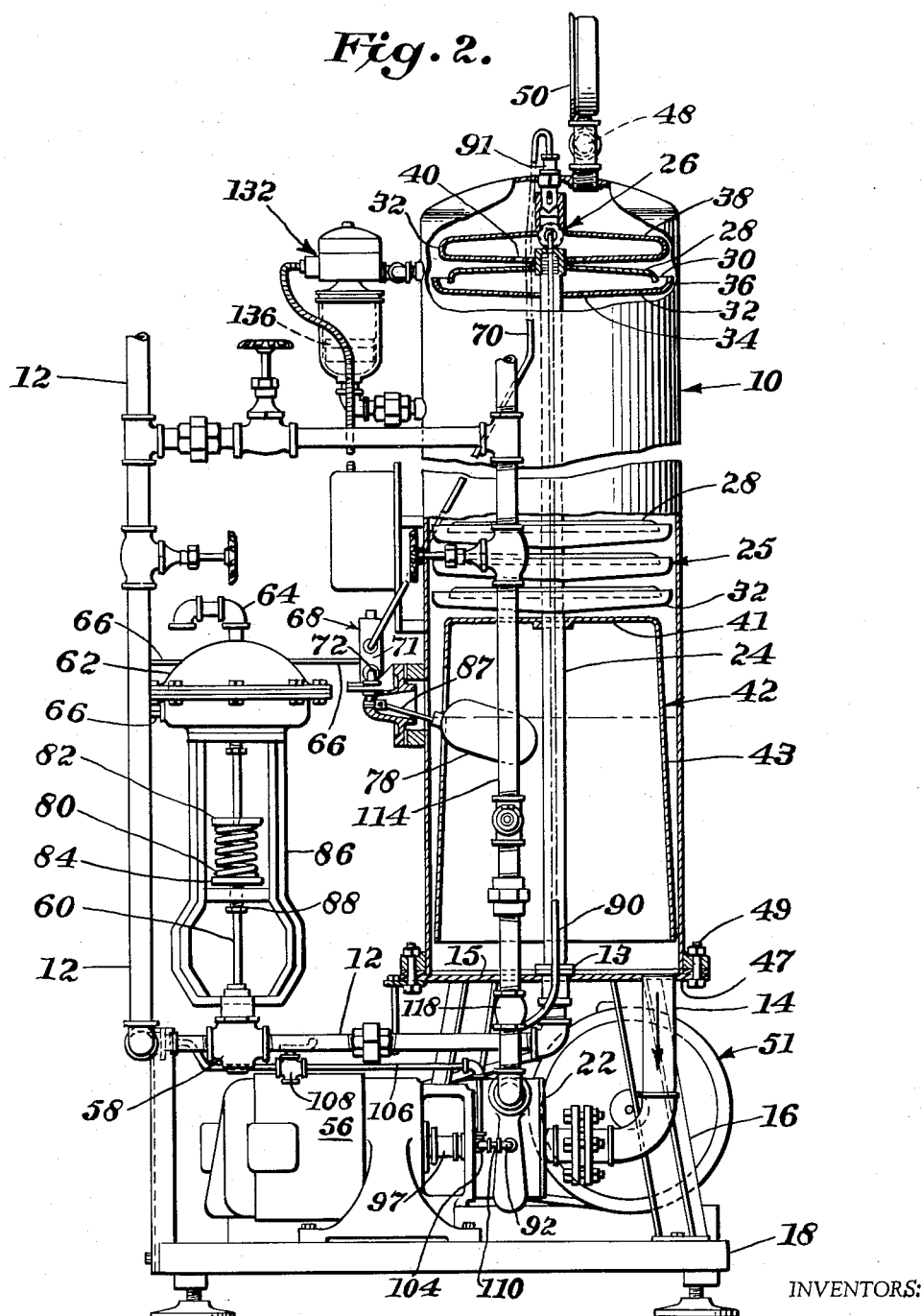
Figure 2 is a side elevational view, partly in section, and looking from the right side of Figure 1.
Figure 3:
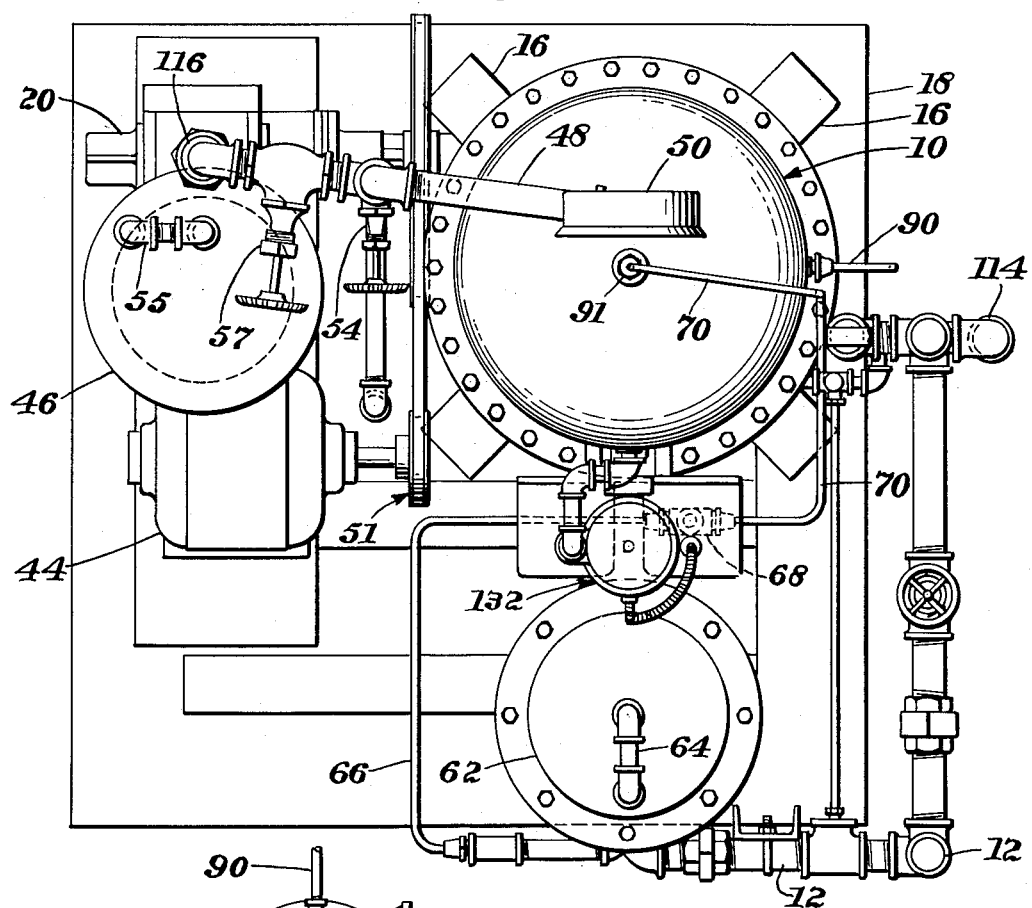
Figure 3 is an enlarged plan view of the apparatus disclosing the various pipes and conduits of the deaerating system.

Referring specifically to Figures 1 and 2, inlet pipe 12 is connected to the bottom of tank 10 by a suitable connection such as the pipe fitting 13 located in the bottom 15 of the tank. Provided within tank 10 is a vertically disposed central pipe 24 which is connected to the other end of pipe fitting 13. At the uppermost end of central pipe 24 is a spray nozzle 26, the purpose of which will be explained in more detail later in the specification. It might be well to mention at this time that pipe 12 is connected to a source of raw liquid supply. In the case where water is the liquid which is being deaerated, pipe 12 may be connected to the source of city supply and, therefore, no pump is necessary to convey the water into tank 10 as the usual city water pressure is sufficient for this purpose.

A plurality of sets of baffle plates, generally indicated 25, are mounted upon central pipe 24 in opened spaced relationship. Any suitable means may be used to attach baffle plates 25 to pipe 24 and to separate them from each other. Each set of baffle plates 25 comprises a dispersing plate 28 upon which the water which is dispersed by the centrally positioned spray nozzle 26 spreads out into a thin film and flows outwardly toward the periphery thereof. The peripherial portion of each plate 28 is turned downwardly at 30 to facilitate a uniform fall of water over the edge thereof to a lower plate. Below each dispersing plate 28 is disposed a second plate 32, which is adapted to collect water or liquid discharged thereon from the edge of plate 28 and spread the same into a second film which is caused to flow inwardly. Each of the plates 32 is provided with a series of openings or holes 34 arranged in annular relationship around the center thereof adjacent pipe 24. The water passes through openings 34 to the next lower plate 28 where the film is again formed and dispersed. It will be noted that the edges of plate 32 are turned upwardly as shown at 36 so that all of the water falling from an upper plate 28 will be caught and the direction of flow of water thereon will always be inwardly. Spray nozzle 26 mounted on the upper end of pipe 24 is positioned interiorly of an upper casing member 38. Water sprayed outwardly through nozzle 26 into the interior of casing member 38 will flow downwardly and inwardly over its slightly sloped bottom surface and pass through a series of apertures 40 adjacent the pipe 24 onto the uppermost dispersing plate 28.

It can now be seen that water or liquid is supplied to deaerator tank 10 at the top thereof through the centrally positioned spray nozzle 26 and is subjected to flow over a plurality of vertically spaced plates 28 and 32 in a thin film. By having the liquid flowing in a thin film, the vacuum established in tank 10 will be able to act on more surface of the liquid so as to more completely remove air dissolved or entrained in the liquid. By having a plurality of such plates, a new surface of the liquid flowing down through tank 10 is presented to each successive plate and consequently the vacuum established within tank 10 is able to remove substantially all of the air contained within the liquid.

Because baffle plates 28 and 32 do not extend to the bottom of tank 10, an anti-splash shield 42 having an enclosed top 41 and downwardly and outwardly depending sides 43 is provided below the lowermost baffle plate 32. The purpose of anti-splash shield 42 is to prevent the liquid from splashing in the bottom of tank 10 and, thus, possibly absorb any air previously released from the liquid which still happens to be within the tank. The water will roll vertically down the sloping sides 43 of anti-splash shield 42 to the bottom of tank 10 where it is stored until discharged as needed.

As previously stated, tank 10 is vacuumized by means of a high capacity vacuum pump capable of creating a vacuum in the tank of approximately 29½ inches Hg or better. Vacuum pump 20 is driven by an electric motor 44 through a belt drive 51 or the like. The suction or inlet side of vacuum pump 20 is connected directly to the interior of tank 10 at the top thereof by means of a conduit or vacuum line 48. A suitable gauge 50 is provided on top of tank 10 so that the operator may determine the vacuum established within the deaerating chamber at any time. A drain line 52 is connected to vacuum line 48 intermediate tank 10 and vacuum pump 20 by any suitable means and is provided with conventional type of valve 54 in order that any liquid trapped therein can be drained when necessary. Drain line 52 is also of value in the system when it is desired to flush the apparatus with a detergent. A valve 57 in line 48, intermediate the vacuum pump 20 and the connection of drain line 52 to line 48, may be closed so that a detergent can be run through the apparatus without going through the vacuum pump 20. Normally closed valve 54, must be opened during a cleaning operation.

An oil separator 46 of conventional type is provided in the inlet line from vacuum pump 20. As shown in Figure 1, oil separator 46 is provided with a sight gauge 53 and an outlet to atmosphere 55. The purpose of providing an oil separator on the outlet side of the vacuum pump is to baffle out any oil entrained by the air discharged from the vacuum pump and, thereby permitting its reuse and preventing its discharge into the room where the apparatus is located.

Referring now to Figure 2 it will be noted that deaerated liquid discharge line 14 feeds into the eye or suction side of the discharge pump 22 from the bottom 47 of tank 10. Pump 22 is a centrifugal type of pump having a casing 96, an impeller in the casing (not shown), a drive shaft 97 for the impeller, and a stuffing box 94 housing the drive shaft. A suitable electric motor 56 is provided to drive the impeller of pump 22 through drive shaft 97. Since the liquid discharge pump 22 is operating against a vacuum established within tank 10 of 29½ inches Hg or better and there is only approximately an 18 inch head of water therein, suitable means must be provided for priming and maintaining the prime of the pump when it is operating. A more detailed description of the means for priming and maintaining the prime of pump 22 will be given later in the specification.

Because it is necessary to supply raw liquid to the tank 10 only when the liquid supply therein has been depleted a predetermined amount, an important feature of the present invention is the novel manner of controlling the flow of raw liquid into tank 10 through nozzle 26 dependent on the level of liquid in the tank and the vacuum therein. A valve 58 is provided in inlet pipe 12 and, in operation, this valve is dependent upon a series of existing conditions within tank 10, namely, the level of liquid and the vacuum therein. Valve 58 is a fluid operated valve of the type having a diaphragm (not shown) connected to the valve operating stem 60. The diaphragm is enclosed within a diaphragm casing 62 and has one side thereof open to atmosphere through the pipe 64 while the other side thereof is connected by means of a pipe 66 to a pilot control device or valve 68.

The pilot control device, as best shown in Figures 5 and 6, comprises a body portion 71 having a vertical bore 73 therethrough, which receives an elongated multiple plunger valve element 74. Body portion 71 is also provided with a lateral port 75, to which is connected pipe 66 leading from the diaphragm operated valve 58, and lateral ports 77 and 79. Connected to port 77 is a conduit communicating with the interior of tank 10 while port 79 is connected to an elbow 72 communicating with atmosphere. Multiple plunger valve element 74 is provided with spaced plungers 81 and 83 adapted to alternately close the ports 77 and 79 respectively. The upper end of vertical bore 73 is closed by means of a plug 85 and a spring 76 is provided between valve element 74 and the plug to urge the valve element toward the closed position. The lower end of the stem of valve element 74 is adapted to be engaged by an operating arm 87 of float 78. Thus, when the level of liquid in tank 10 drops below a predetermined level the float 78 will drop and cause valve element 74 to rise and open port 77 and bring line 70 in communication with line 66. Line 70 which is connected to the interior of tank 10 will permit the vacuum established in tank 10 to be applied to the under surface of the diaphragm in diaphragm casing 62. The diaphragm will be deflected downwardly due to the fact that there is a vacuum on one side thereof and atmospheric pressure on the other side thereof. Movement of the diaphragm downwardly will cause valve stem 60 to move downwardly and open valve 58 to permit raw liquid to flow through line 12 into tank 10. It will now be seen that operation of valve 58 is dependent upon two separate fluid conditions present in tank 10. First, the liquid in tank 10 must drop below a predetermined level so that the pilot control device 68 will operate to make line 66 in open communication with line 70 leading to the interior of the tank. Then, if the proper vacuum has been established within tank 10, valve 58 will be actuated by the diaphragm in the diaphragm casing 62. This is of importance in starting the apparatus at the beginning of an operating day in order that the tank 10 may be properly vacuumized so that liquid entering the tank will be properly deaerated before it can be discharged. Further, should the operating vacuum in the tank be insufficient during the course of operation, the valve 58 will not operate since the diaphragm will not be responsive. This last mentioned condition will remain until such time as a proper vacuum has been established. An important advantage of a means for controlling inflow of raw liquid is the production of a deaerated liquid with a uniform residual air content.

Since the deaerating device may be operated at different vacuums to obtain different degrees of deaeration of the final product delivered therefrom by adjustment of vacuum pump 20, suitable means are provided for adjusting the vacuum at which the diaphragm in diaphragm casing 62 will operate. Such means may be a spring 80 positioned between a stop 82 rigidly on valve operation stem 60 and a stop 84 adjustably mounted on the valve stem 60. Adjustment of the spring tension may be easily made by turning the adjustable stop 84 on its threaded boss 88 mounted in frame 86 to adjust the load thereon.

It has been mentioned that the system may be completely flushed with a detergent by closing valve 57 and opening valve 54. Since line 70 connects the interior of tank 10 with the pilot control device 68, it is necessary to provide a check valve 91 in this line adjacent the top of tank 10 to prevent flooding of the vacuum control system of water flow valve 58. Check valve 91 may be of the float type which will close when it comes in contact with the liquid flowing through tank 10.

Figure 4:
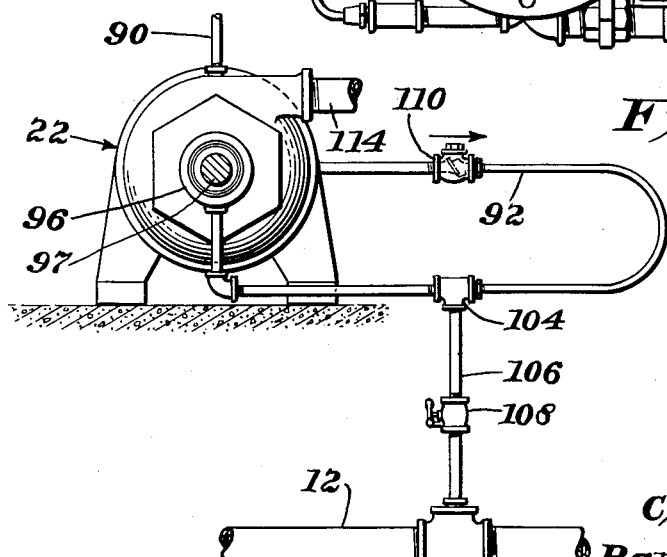
Figure 4 is a view of the liquid pump disclosing the means for priming and maintaining the prime of the same.

As previously stated, centrifugal pump 22 must operate against a vacuum of 29½ inches of Hg established in tank 10 with only an approximate 18 inch head of liquid. Therefore, pump 22 must be primed and this prime must be maintained throughout the operation of the device. Referring now to Figures 4 and 7 it will be noted that pump 22 is provided with a pipe 90 leading from the pressure zone of the pump and connecting to the interior of tank 10. Further, a second line 92 is also connected to the pressure zone of pump 22 and leads therefrom to the stuffing box generally indicated 94 in pump casing 96. Provided in the stuffing box 94 is a lantern ring 98 which is substantially H shaped in cross section and provided with radially extending apertures 100. Pipe 92 which is connected to pump casing 96 is in open communication with the lantern ring 98 through a bore 102 in pump casing 96. Intermediate the pressure zone and the lantern ring, a T connection 104 is provided in line 92 in order that a pipe 106 leading to the raw liquid supply pipe 12 can be attached. Pipe 106 is provided with a hand operated valve 108. Line 92 is further provided with a one-way check valve 110 positioned adjacent its entrance into the high pressure zone of the pump 22. Check valve 110 will permit the flow of liquid from the pressure zone of pump 22 to lantern ring 98 when the pump is operating but will not permit the reverse flow of raw liquid to enter the pressure zone when valve 108 is opened.

After a proper vacuum has been established in tank 10, it is necessary to start to prime the pump 22 in order that the liquid deaerated in tank 10 may be discharged. However, because the pump must operate against a vacuum and deliver liquid from its outlet at a positive pressure, a positive liquid pressure must be maintained on the stuffing box 94 so that air will not be drawn into the suction or "eye" of the pump along the drive shaft 97 thereof. To obtain a momentary positive liquid pressure on the stuffing box, the valve 108 is manually depressed allowing liquid from the raw liquid supply to produce a positive pressure in stuffing box 94. As soon as pump 22 has established its prime, as evidenced by a pressure gauge 112 mounted in discharge pipe 114 of the pump, spring operated valve 108 is released. A positive pressure will be maintained on the stuffing box since the line 92 is connected from the pressure zone to the stuffing box.

Line 90 aids in establishing and maintaining a prime on pump 22 in that line 90 will cause pressure conditions on the suction and discharge of the pump to equalize. This condition of prime is maintained regardless of whether or not liquid is being discharged from the tank. In other words, a prime must be maintained on the pump while it is running even though it is not delivering liquid from the tank. Further, line 90 also serves to maintain a small load on and prevents overheating of pump 22 while it is operating under stand-by conditions.

Since it is important to be able to start and stop a deaerating device of this type and still obtain the same conditions of deaeration at all times, provisions have been made to provide the apparatus with means for meeting such conditions. In order that air will not be drawn through the vacuum pump when the vacuum pump is stopped, a check valve 116 is provided in vacuum line 48 leading from tank 10. Discharge line 114 from pump 22 is also provided with a check valve 118 which allows the flow of deaerated liquid therein in one direction only. By having check valves 116 and 118 in the vacuum line 48 and liquid discharge line 114 respectively, the system may be shut off without a material loss of vacuum and the liquid trapped in tank 10 will remain deaerated. Further, the provision of these check valves provides for quicker starting in that deaerated liquid can be immediately delivered from pump 22.

Figures 8 and 9 disclose the electrical circuit for starting and stopping the motors for the vacuum and liquid discharge pumps respectively. In Figure 8 it will be evident that the motor 44 for vacuum pump 20 is of the three-phase type having a master switch 120. In the circuit for starting motor 44 there is provided an overload coil 122, a magnetic coil 124, a switch 126 operated by magnetic coil 124, a start switch 128 and a stop switch 130. Also provided in the starting circuit for the vacuum pump is a "Magnitrol" 132, as shown in Figures 1 and 2, which contains a mercury switch 134. As shown in Figure 2 mercury switch 134 is operated by a float 136 in the "Magnitrol" unit 132.

To start the vacuum pump, master switch 120 is closed and then start button 128 is pressed, momentarily closing a circuit through magnetic coil 124 and overload coil 122. The magnetic coil 124 will close switch 126 and a holding circuit will then be made through the overload coil 122, the magnetic coil 124, the stop switch 130 and the mercury switch 134. The motor 44 and the vacuum pump 20 will then operate. Should the level of liquid rise in tank 10 to such a point where the float 136 is raised, there would be danger of liquid being drawn through the vacuum pump. To overcome this the float 136 will operate mercury switch 134 so that vacuum pump 22 cannot operate if the level of liquid in tank 10 is too high. Further, if for any reason the level of liquid in tank 10 rises during the course of an operating day to an undesirable height, the "Magnitrol" 132 will operate to break the circuit of the vacuum pump motor 44. To stop vacuum pump 22, it is merely necessary to break the holding circuit by pressing stop switch 134.

The circuit for motor 56 which operates centrifugal pump 22 is substantially the same as the circuit disclosed in Figure 8 and explained above. The only difference between the circuit disclosed in Figure 9 from that of Figure 8 is the elimination of the mercury switch 134 and "Magnitrol" 132 and, therefore, a detailed explanation of the circuit disclosed in Figure 9 will not be necessary. It will suffice to say that pump 22 may be started after master switch 120' has been closed by pressing the start button 128' which energizes magnetic coil 124' to close switch 126' and make a holding circuit. To stop the motor 56 which operates pump 22, it is merely necessary to press the stop button 130' which breaks the circuit.

The operation of the device may be briefly described as follows:

First, a vacuum must be created in tank 10. This is done by energizing the circuit to motor 44 which in turn operates vacuum pump 20 to vacuumize tank 10. After sufficient vacuum has been established in tank 10 as evidenced by gauge 50, the motor 56 which operates pump 22 is started by pressing the start button 128'. At the same time that pump 22 is started, it must also be primed and this is accomplished by momentarily pressing the spring operated valve 108 to permit a positive pressure to be established in stuffing box 94. As soon as the positive pressure has been established in stuffing box 94 and the pump has picked up its prime, it will be evident on gauge 112. Valve 108 is immediately released and the prime on pump 22 is maintained through the lines 90 and 92 as previously explained. Raw liquid is supplied to the deaerator through the inlet pipe 12. The infeed of raw liquid into tank 10 is controlled by means of a fluid operated valve 58 which is actuated by deflection of a diaphragm caused by vacuum within tank 10. A pilot control device 68 which is responsive to the level of liquid in tank 10 will cause the diaphragm in diaphragm casing 62 to be actuated by permitting the vacuum in tank 10 to communicate with one side of the diaphragm. It will now be seen that raw liquid will be supplied to tank 10 only when the level of liquid therein has fallen below a predetermined low level. Further, raw liquid will not be supplied to tank 10 unless the vacuum established therein is sufficient to operate the previously set fluid operated valve 58. Consequently, the deaerating apparatus of the present invention will at all times produce a deaerated liquid having a uniform residual air content.

The terminology used in this specification is for the purpose of description and not for limitation as the scope of the invention is defined in the claims.

We claim:

1. In an apparatus of the type described for deaerating a raw liquid, an enclosed tank having an inlet for delivery of raw liquid thereto and an outlet for discharge of deaerated liquid therefrom, means connected to said tank for creating a vacuum therein at a predetermined value, valve means operatively associated with said inlet to control flow of the raw liquid into said tank, said valve means being operable by vacuum established in said tank only when the vacuum is at the predetermined value, and means operatively associated with said valve means and said tank and responsive to the level of liquid in said tank to permit vacuum established in said tank to operate said valve means.

2. In an apparatus of the type described for deaerating a raw liquid, an enclosed upright tank having means therein for distributing liquid in a thin film as it flows therethrough, said tank having an infeed pipe for delivery of the raw liquid to said distributing means and an outlet pipe for discharging deaerated liquid from the bottom of said tank where deaerated liquid collects, a vacuum pump connected to said tank for creating a vacuum therein at a predetermined value whereby liquid flowing in a thin film therethrough will be uniformly deaerated, a fluid operated valve in said infeed pipe for controlling flow of raw liquid to said tank, said fluid operated valve being operable by vacuum established in said tank only when the vacuum is at the predetermined value, a pilot valve responsive to the level of liquid in said tank, said pilot valve being connected by fluid transfer means to said fluid operated valve and to the interior of said tank whereby a drop of liquid level in said tank below a predetermined level will open said pilot valve to permit vacuum when established in said tank at the predetermined value to operate and open said fluid operated valve.

3. In an apparatus of the character described in claim 2 wherein said pilot control valve is float operated.

4. In an apparatus of the character described in claim 2 wherein said fluid operated valve is provided with means to adjust the same to operate at different vacuums established in said tank.

5. In an apparatus of the type described for deaerating a liquid, an enclosed upright tank and means therein for distributing liquid in a thin film as it flows therethrough, said tank having an inlet pipe for delivery of raw liquid to said distributing means and an outlet pipe for discharging deaerated liquid from the bottom of said tank where deaerated liquid collects, a vacuum pump connected to said tank for creating a vacuum therein at a predetermined value whereby liquid flowing in a film through said tank will be uniformly deaerated, valve means in said inlet pipe to control flow of raw liquid into said tank, said valve means being operable by vacuum established in said tank only when the vacuum is at the predetermined value, means operatively associated with said valve means and said tank and responsive to the level of liquid in said tank to permit vacuum established therein to operate said valve means, and a pump connected to said outlet pipe for pumping deaerated liquid from said tank against vacuum established therein.

6. In an apparatus of the type described for deaerating a raw liquid, an upright tank having an inlet pipe for delivery of raw liquid to said tank and an outlet pipe for discharging deaerated liquid from said tank, a vacuum pump connected to said tank by a pipe line entering the top thereof for creating a vacuum therein at a predetermined value, valve means operatively associated with said inlet pipe to control flow of raw liquid into said tank, said valve means being operable by vacuum established in said tank only when the vacuum is at the predetermined value, means operatively associated with said valve means and said tank, said last mentioned means being responsive to the level of liquid in said tank to permit vacuum established in said tank at the predetermined value to operate said valve means, means in said pipe line connecting said vacuum pump to said tank for preventing loss of vacuum established in said tank when said vacuum pump is inoperative, and means to control operation of said vacuum pump, said means including a high level float control device mounted on said tank and responsive to the level of liquid therein whereby a rise in liquid in said tank above a predetermined level will permit said vacuum pump from being started and if said vacuum pump is operated will stop the same.

7. In an apparatus of the character described in claim 6 wherein said means for preventing loss of vacuum established in said tank when said vacuum pump is inoperative is a check valve.

8. In an apparatus of the character described for deaerating a raw liquid, an upright tank having an inlet pipe for delivery of raw liquid thereto and an outlet pipe for discharging deaerated liquid therefrom, a vacuum pump connected to said tank by a pipe line entering the top thereof and creating a vacuum therein at a predetermined value, means operatively associated with said inlet pipe and said tank for controlling flow of liquid into said tank, said means being responsive to the level of liquid in said tank and operable by vacuum established therein, means in said pipe line connecting said vacuum pump to said tank for preventing the loss of vacuum established in said tank when said pump is inoperative, means in said outlet pipe from said tank for permitting flow therein in one direction and a high level float control device mounted on said tank and responsive to the level of liquid in said tank, said high level float control device controlling the operation of said vacuum pump to stop the same when the level of liquid in said tank is above a predetermined level and to prevent the same from being started when the level of liquid in said tank is above a predetermined level.

9. In an apparatus of the character described in claim 8 wherein said means for preventing the loss of vacuum established in said tank when said vacuum pump is inoperative is a check valve.

10. In an apparatus of the character described in claim 8 wherein said means in said outlet pipe for permitting the flow therein in one direction is a check valve.

11. In an apparatus of the type described for deaerating a raw liquid, an enclosed tank, a supply pipe connected to said tank for supplying raw liquid thereto, a discharge pipe connected to said tank for discharging deaerated liquid therefrom, means for creating a vacuum in said tank, a centrifugal pump adapted to operate against vacuum established in said tank and to remove deaerated liquid therefrom, said centrifugal pump including a pump casing, an impeller mounted in said casing and having a drive shaft therefor, and a stuffing box surrounding said drive shaft and also mounted in said casing, means for priming and maintaining a prime on said pump, said last mentioned means including fluid transfer means connecting the pressure zone of said pump with the interior of said tank, means connecting the interior of the stuffing box with the pressure zone of said pump for maintaining a positive pressure on said stuffing box when said pump is operated, and means connected to said last mentioned means for momentarily maintaining a positive liquid pressure on the stuffing box of said pump when said pump is started.

12. In an apparatus of the type described for deaerating a raw liquid, an enclosed tank, a supply pipe connected to said tank for supplying a raw liquid thereto, a discharge pipe connected to said tank for discharging deaerated liquid therefrom, means for creating a vacuum in said tank, a centrifugal pump adapted to operate against vacuum established in said tank and to remove deaerated liquid therefrom, said centrifugal pump including a pump casing, an impeller mounted in said casing and having a drive shaft therefor, and a stuffing box surrounding said drive shaft and mounted in said casing, said stuffing box including a lantern ring assembly, a pipe connecting the pressure chamber of said centrifugal pump with the interior of said tank whereby pressure on the inlet and the discharge side of said pump is equalized, a second pipe line connecting said lantern ring assembly with the pressure chamber of said centrifugal pump for maintaining a positive pressure on the stuffing box when said pump is operating, and means connected to said second pipe line for momentarily applying a positive liquid pressure on said stuffing box through said lantern ring to provide a liquid seal and prevent air being drawn into the suction eye of said centrifugal pump when said pump is started.

13. In an apparatus of the character described in claim 12 wherein said last named means includes a pipe line connecting said second pipe line with the raw liquid supply pipe and having valve means therein for supplying raw liquid thereto.

14. In an apparatus of the character described in claim 12 wherein means are provided in said second pipe line to prevent liquid from entering said pump casing while permitting liquid to be discharged from said pump casing to said stuffing box when said pump is operating.

References Cited in the file of this patent

UNITED STATES PATENTS

| | | |
|---|---|---|
| 1,350,576 | Smith | Aug. 24, 1920 |
| 1,598,787 | Shields et al. | Sept. 7, 1926 |
| 1,783,667 | Mueller | Dec. 2, 1930 |
| 1,910,775 | Saxe | May 23, 1933 |
| 2,077,011 | Robinson | Apr. 13, 1937 |
| 2,154,529 | Raymond | Apr. 18, 1939 |
| 2,343,317 | Olson | Mar. 7, 1944 |
| 2,347,751 | Reeves | May 2, 1944 |
| 2,348,357 | Parks | May 9, 1944 |
| 2,664,170 | Walker et al. | Dec. 29, 1953 |
| 2,690,131 | Butler | Sept. 28, 1954 |

FOREIGN PATENTS

| | | |
|---|---|---|
| 847,641 | Germany | Aug. 25, 1952 |